United States Patent
Seo et al.

(10) Patent No.: US 10,353,212 B2
(45) Date of Patent: Jul. 16, 2019

(54) SEE-THROUGH TYPE DISPLAY APPARATUS AND METHOD OF OPERATING THE SAME

(71) Applicant: SAMSUNG ELECTRONICS CO., LTD., Suwon-si (KR)

(72) Inventors: Juwon Seo, Osan-si (KR); Yuntae Kim, Suwon-si (KR); Wontaek Seo, Yongin-si (KR); Geeyoung Sung, Daegu (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/708,330

(22) Filed: Sep. 19, 2017

(65) Prior Publication Data

US 2018/0196274 A1 Jul. 12, 2018

(30) Foreign Application Priority Data

Jan. 11, 2017 (KR) .................. 10-2017-0004168

(51) Int. Cl.

| | | |
|---|---|---|
| *G06F 3/01* | (2006.01) | |
| *G02B 27/01* | (2006.01) | |
| *G02B 27/02* | (2006.01) | |
| *G02B 27/22* | (2018.01) | |
| *G06T 19/00* | (2011.01) | |
| *G09G 3/00* | (2006.01) | |

(52) U.S. Cl.
CPC ..... *G02B 27/2278* (2013.01); *G02B 27/0172* (2013.01); *G02B 27/022* (2013.01); *G06F 3/011* (2013.01); *G06T 19/006* (2013.01); *G09G 3/003* (2013.01); *G09G 2380/10* (2013.01)

(58) Field of Classification Search
CPC .............. G02B 27/2278; G02B 27/022; G02B 27/0172; G06T 19/006; G09G 3/003; G06F 3/011
See application file for complete search history.

(56) References Cited

U.S. PATENT DOCUMENTS

| | | | | |
|---|---|---|---|---|
| 6,795,042 B1* | 9/2004 | Nagata | ............... | G02B 27/0172 345/15 |
| 9,274,340 B2 | 3/2016 | Lyons | | |
| 2002/0113752 A1* | 8/2002 | Sullivan | ............. | G02B 27/2278 345/6 |
| 2006/0273983 A1* | 12/2006 | Koo | ................... | G02B 27/2278 345/6 |

(Continued)

FOREIGN PATENT DOCUMENTS

| | | |
|---|---|---|
| CN | 204244391 U | 4/2015 |
| JP | 9-331552 A | 12/1997 |
| JP | 11165577 A | 6/1999 |

*Primary Examiner* — Marnie A Matt
(74) *Attorney, Agent, or Firm* — Sughrue Mion, PLLC

(57) ABSTRACT

A see-through type display apparatus and a method of operating the see-through type display apparatus are provided. The see-through type display apparatus simultaneously outputs a plurality of two-dimensional (2D) images having different depth information onto different regions, produces a multi-layered depth image by sequentially arranging the plurality of 2D images according to the depth information, and causes the multi-layered depth image and a reality environment to converge onto one region.

17 Claims, 9 Drawing Sheets

(56) References Cited

U.S. PATENT DOCUMENTS

| | | | |
|---|---|---|---|
| 2011/0075257 A1* | 3/2011 | Hua | G02B 27/017 359/464 |
| 2011/0194029 A1* | 8/2011 | Herrmann | G02B 27/017 348/569 |
| 2011/0227812 A1* | 9/2011 | Haddick | G02B 27/017 345/8 |
| 2012/0188637 A1* | 7/2012 | Joseph | G02B 27/2278 359/478 |
| 2015/0234189 A1* | 8/2015 | Lyons | G02B 27/0172 345/174 |
| 2015/0346495 A1* | 12/2015 | Welch | G02B 27/0172 345/8 |
| 2016/0080720 A1* | 3/2016 | Fullam | H04N 13/398 345/156 |
| 2016/0086379 A1* | 3/2016 | Sadi | G06T 19/006 345/633 |
| 2016/0171704 A1* | 6/2016 | Raghoebardajal | H04N 13/122 345/633 |
| 2016/0195723 A1 | 7/2016 | Murray et al. | |
| 2017/0098312 A1* | 4/2017 | Souchard | G02B 27/017 |
| 2018/0024355 A1* | 1/2018 | Gao | G02B 6/00 359/630 |

\* cited by examiner

SEE-THROUGH TYPE DISPLAY APPARATUS AND METHOD OF OPERATING THE SAME

CROSS-REFERENCE TO RELATED APPLICATION

This application claims priority from Korean Patent Application No. 10-2017-0004168, filed on Jan. 11, 2017, in the Korean Intellectual Property Office, the disclosure of which is incorporated herein by reference in its entirety.

BACKGROUND

1. Field

Exemplary embodiments relate to display apparatuses, and more particularly, to a see-through type display apparatus and a method of operating the see-through type display apparatus.

2. Description of the Related Art

Recently, as electronic devices and display devices capable of implementing virtual reality (VR) have been developed, much attention has been paid thereto. Research has been conducted on a technique (method) of implementing augmented reality (AR) and mixed reality (MR) as a next step in the evolution of VR.

AR is a display technique of significantly increasing the effect of reality by overlapping (combining) a virtual object or information with a reality environment, unlike VR which presupposes only a virtual world. While VR is restrictively applicable to the field of games or the field of virtual experience, AR is applicable to a variety of reality environments. In particular, AR has drawn attention as next-generation display technology which is appropriate for a ubiquitous environment or an internet-of-things (IoT) environment. AR results in mixing a reality world and additional information (a virtual world) together and may be thus considered as one example of MR.

SUMMARY

Provided are a see-through type display apparatus which is applicable to implementing augmented reality (AR) or mixed reality (MR) and a method of operating the same.

Provided are a see-through type display apparatus for displaying a two-dimensional (2D) image at two different depths and a method of operating the same.

Additional aspects will be set forth in part in the description which follows and, in part, will be apparent from the description, or may be learned by practice of the presented exemplary embodiments.

According to an aspect of an exemplary embodiment, a see-through type display apparatus includes a spatial light modulator configured to simultaneously output a first two-dimensional (2D) image onto a first region and at least a second 2D image onto a second region that is different from the first region, the first 2D image having first depth information and the second 2D image having second depth information that is different from the first depth information; a depth generation member configured to produce a multi-layered depth image by sequentially arranging the first 2D image and the at least second 2D image based on the first depth information and the second depth information; and an image convergence member configured to cause the multi-layered depth image and a reality environment to converge on a single region by changing at least one from among a light path of the multi-layered depth image and a light path of the reality environment.

The depth generation member may include a first depth generation member configured to reflect the first 2D image to the image convergence member; and a second depth generation member configured to reflect the second 2D image to the image convergence member.

The second depth generation member may be further configured to transmit the first 2D image reflected by the first depth generation to the image convergence member.

The depth generation member may include at least one from among a mirror and a half-mirror.

The first 2D image and the at least second 2D image may be sequentially arranged on an optical axis of the depth generation member.

For each respective 2D image from among the first 2D image and the at least second 2D image, a corresponding distance from the image convergence member may vary directly with a level of depth information associated with the respective 2D image.

At least two 2D images from among the first 2D image and the at least second 2D image may have different brightnesses.

For each respective 2D image from among the first 2D image and the at least second 2D image, a corresponding brightness may vary directly with a level of depth information associated with the respective 2D image.

At least two 2D images from among the first 2D image and the at least second 2D image may have different sizes.

For each respective 2D image from among the first 2D image and the at least second 2D image, a corresponding size may vary directly with a level of depth information associated with the respective 2D image.

Each of the first 2D image and the at least second 2D image may include a respective left-eye image and a respective right-eye image.

For each respective 2D image from among the first 2D image and the at least second 2D image, the respective left-eye image and the respective right-eye image may be simultaneously output onto different regions.

The see-through type display apparatus may further include an expansion optical device configured to expand the multi-layered depth image, the expansion optical device being arranged between the depth generation member and the image convergence member.

The image convergence member may include at least one from among a beam splitter and a transflective film.

The image convergence member may include a first region and a second region having a curved interface which is in contact with the first region.

A reflecting material may be coated onto the interface of the second region.

According to another aspect of an exemplary embodiment, a method of operating a see-through type display apparatus includes simultaneously outputting a first two-dimensional (2D) image onto a first region and at least a second 2D image onto a second region that is different from the first region, the first 2D image having first depth information and the second 2D image having second depth information that is different from the first depth information; producing a multi-layered depth image by sequentially arranging the first 2D image and the at least second 2D image based on the first depth information and the second depth information; and converging the multi-layered depth image and a reality environment on a single region by changing at least one from among a light path of the multi-layered depth image and a light path of the reality environment.

The producing of the multi-layered depth image may include reflecting the first 2D image; and reflecting the second 2D image while transmitting the first 2D image.

The first depth information may have a value that is greater than a value of the second depth information.

The method may further include expanding the multi-layered depth image.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
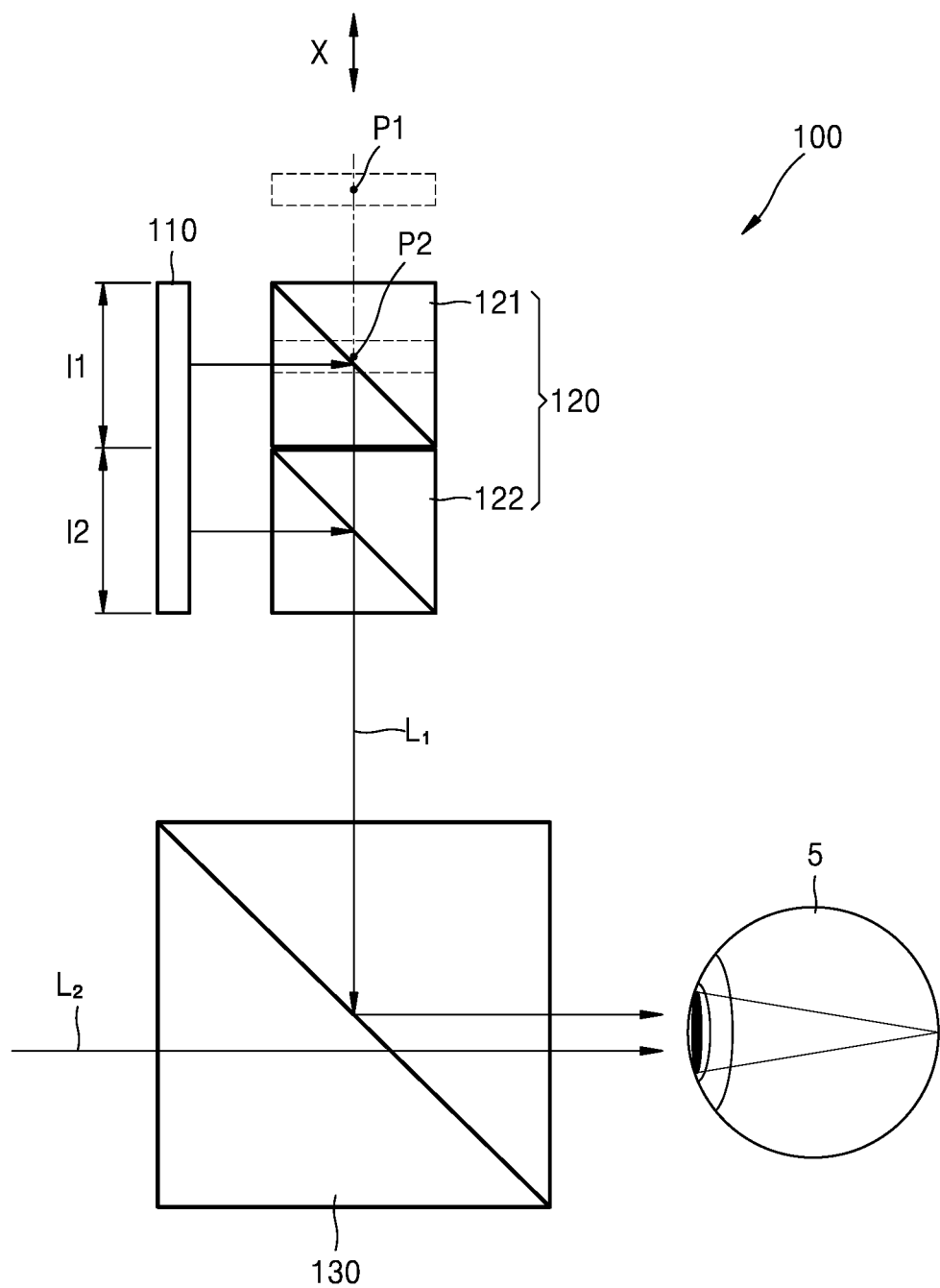
FIG. 1 is a diagram illustrating a see-through type display apparatus, according to an exemplary embodiment.

Hereinafter, a see-through type display apparatus and an electronic device having the same according to exemplary embodiments will be described in detail with reference to the accompanying drawings. In the drawings, the widths and thicknesses of layers or regions may be exaggerated for clarity. In the present disclosure, the same reference numerals denote the same elements.

It will be understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being 'above' or 'on' another element or layer, the element or layer can be positioned directly on the top, the bottom, a left side, or a right side of another element or layer to be in contact with the other element or layer, or can be positioned above, below, in a left direction, or in a right direction of another element or layer to not be in contact with the other element or layer. Exemplary embodiments will be hereinafter described in detail with reference to the accompanying drawings.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

As used herein, the term 'and/or' includes any and all combinations of one or more of the associated listed items. Expressions such as 'at least one of,' when preceding a list of elements, modify the entire list of elements and do not modify the individual elements of the list.

Figure 2:
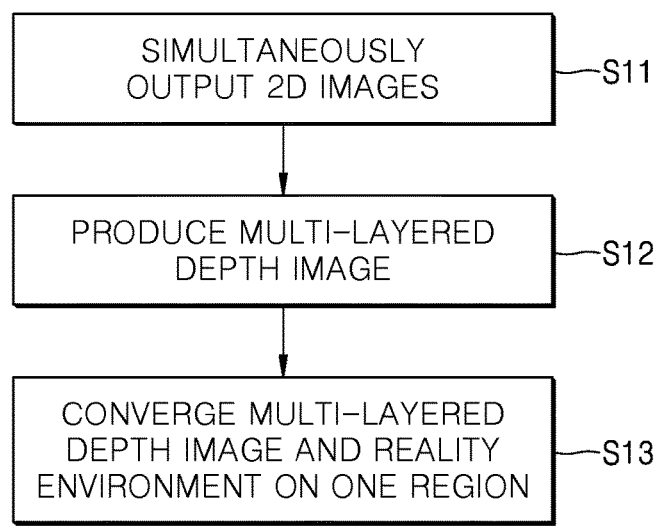
FIG. 2 is a flowchart illustrating a method of operating the see-through type display apparatus of FIG. 1.

FIG. 1 is a diagram illustrating a see-through type display apparatus 100, according to an exemplary embodiment. FIG. 2 is a flowchart illustrating a method of operating the see-through type display apparatus 100 of FIG. 1

Referring to FIGS. 1 and 2, the see-through type display apparatus 100 includes a spatial light modulator 110 which simultaneously outputs a plurality of two-dimensional (2D) images, a depth generation member 120 which produces a multi-layered depth image from the plurality of 2D images, and an image convergence member 130 which causes the multi-layered depth image and a reality environment to converge onto a single region.

In operation S11, the spatial light modulator 110 of the see-through type display apparatus 100 simultaneously outputs a plurality of 2D images of different depth information (i.e., each respective 2D image is associated with corresponding depth information that varies from image to image). In operation S12, the depth generation member 120 produces a multi-layered depth image by sequentially arranging the plurality of 2D images according to the depth information. In operation S13, the image convergence member 130 causes the multi-layered depth image and a reality environment to converge onto one single region by changing at least one from among a light path of the multi-layered depth image and a light path of the reality environment.

The spatial light modulator 110 may simultaneously output the plurality of 2D images having different depth information on different respective regions. For example, the spatial light modulator 110 may output a first image I1 having first depth information onto a first region on the top of the spatial light modulator 110, and the spatial light modulator may output a second image I2 having second depth information onto a second region on the bottom of the spatial light modulator 110. A value of the first depth information may be greater than that of the second depth information. In particular, a user may feel as if the first image I1 is being displayed behind (i.e., at a greater depth than) the second image I2. Since the spatial light modulator 110 simultaneously outputs the plurality of 2D images having different depth information, a signal processing load may be lower than when the plurality of 2D images having different depth information are sequentially displayed as a function of time.

The spatial light modulator 110 may be any of an amplitude-modulation spatial light modulator or a phase-modulation spatial light modulator, or may be a complex spatial light modulator which performs both amplification modulation and phase modulation. Alternatively, the spatial light modulator 110 may be any of a transmission optical modulator, a reflective optical modulator, or a transflective optical modulator. Examples of the spatial light modulator 110 may include a liquid crystal on silicon (LCoS) panel, a liquid crystal display (LCD) panel, a digital light projection (DLP) panel, an organic light-emitting diode (OLED) panel, a micro-organic light-emitting diode (M-OLED), etc. In this aspect, examples of the DLP panel may include a digital micro-mirror device (DMD).

The depth generation member 120 may produce a multi-layered depth image by sequentially arranging the plurality of 2D images according to the depth information. In this aspect, the multi-layered depth image is an image in which the plurality of 2D images are arranged (or displayed or formed) on different points corresponding to the depth information, and is thus recognizable by a user as an image having depth information.

The plurality of 2D images may be sequentially arranged on a center axis X of the depth generation member 120. In particular, since the plurality of 2D images are arranged at different points according to the depth information, a user may recognize the sequentially arranged 2D images as a depth image. The depth generation member 120 may include at least one of a mirror and a half-mirror.

The depth generation member 120 may include a first depth generation member 121 which reflects the first image I1 having the first depth information to the image convergence member 130 and a second depth generation member 122 which reflects the second image I2 having the second depth information to the image convergence member 130. The first and second depth generation members 121 and 122 may be arranged in parallel on the center axis X of the depth generation member 120. The second depth generation member 122 may transmit the first image I1 reflected by the first depth generation member 121 to the image convergence member 130. The first depth generation member 121 may be a mirror or a half-mirror. The second depth generation member 122 may be a half-mirror.

The first depth generation member 121 reflects the first image I1 which is output from the spatial light modulator 110, and as a result, the first image I1 looks as if it is displayed at a first point P1. The second depth generation member 122 reflects the second image I2 which is output from the spatial light modulator 110, and as a result, the second image I2 looks as if it is displayed at a second point P2. The first image I1 and the second image I2 may be formed at different points to produce a multi-layered depth image. Although for convenience of explanation, FIG. 1 illustrates that a multi-layered depth image is produced by using the two depth generation members 121 and 122, exemplary embodiments are not limited thereto. In particular, the spatial light modulator 110 may simultaneously output three or more 2D images, each of which has different respective depth information. The depth generation member 120 may produce a multi-layered depth image from the three or more 2D images.

The image convergence member 130 may cause the multi-layered depth image and a reality environment to converge onto one single region by changing at least one of a light path L1 of the multi-layered depth image and a light path L2 of the reality environment. In this aspect, the one region may be a user's ocular organ 5, i.e., an eye 5. The image convergence member 130 may transfer a plurality of light beams along the light paths L1 and L2 to the user's pupil. For example, the image convergence member 130 may transfer or guide, to the user's ocular organ 5, light corresponding to the multi-layered depth image 10 in the first light path L1 and external light corresponding to a reality environment in the second light path L2.

The light in the first light path L1 may be light reflected by the image convergence member 130. The light in the second light path L2 may be light that has propagated through the image convergence member 130. The image convergence member 130 may be a transflective member having both a light transmission property and a light reflection property. As a concrete example, the image convergence member 130 may include a beam splitter or a transflective film. Although FIG. 1 illustrates a case in which the image convergence member 130 is a beam splitter, a structure of the image convergence member 130 may be variably altered.

The multi-layered depth image transferred using the light in the first light path L1 may be an image formed and provided in the see-through type display apparatus 100. The multi-layered depth image may be a 'display image' including virtual reality or virtual information. The reality environment transferred using the light in the second light path L2 may be an environment which a user faces through the see-through type display apparatus 100. The reality environment may include a panoramic view which the user faces, and a background subject. Thus, the see-through type display apparatus 100 according to the present exemplary embodiment is applicable to an implementation of augmented reality (AR) or mixed reality (MR).

Various types of optical devices, e.g., a lens, may be arranged between the spatial light modulator 110 and the depth generation member 120, or between the depth generation member 120 and the image convergence member 130.

An image output from the spatial light modulator 110 is a 2D image as described above. The 2D image may be an image for realizing a stereoscopic image. Examples of the 2D image may include a left-eye image to be seen with a user's left eye and a right-eye image to be seen with a user's right eye.

Figure 3:
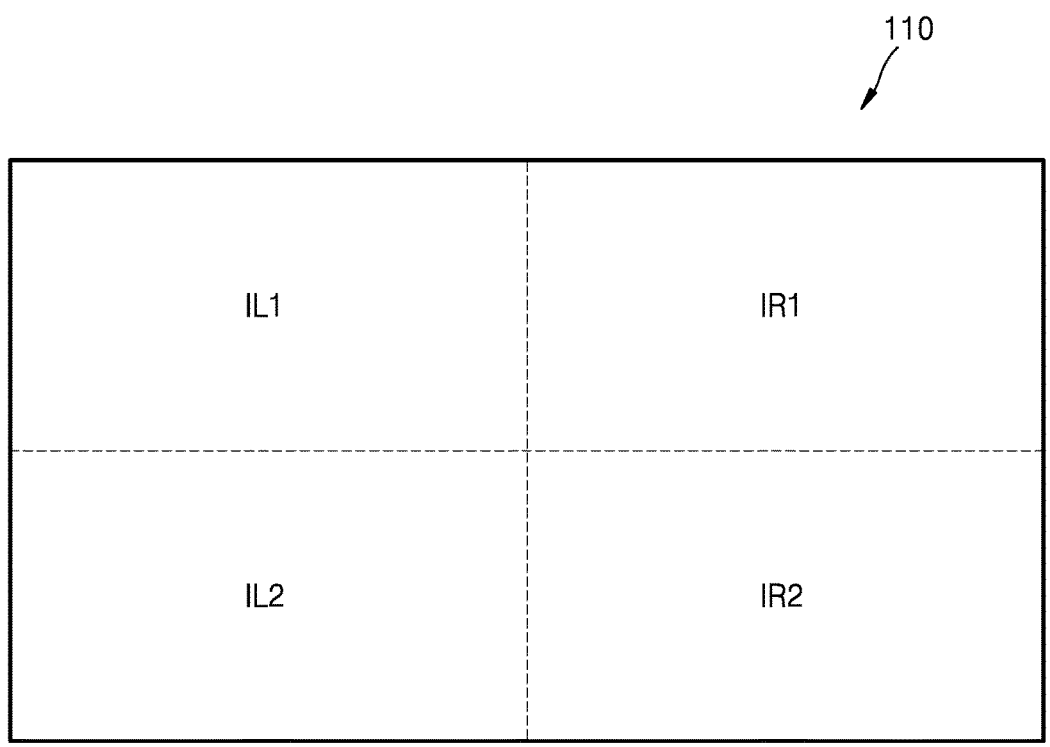
FIG. 3 is a diagram illustrating an image output from a spatial light modulator of a see-through type display apparatus, according to an exemplary embodiment.
Figure 4:
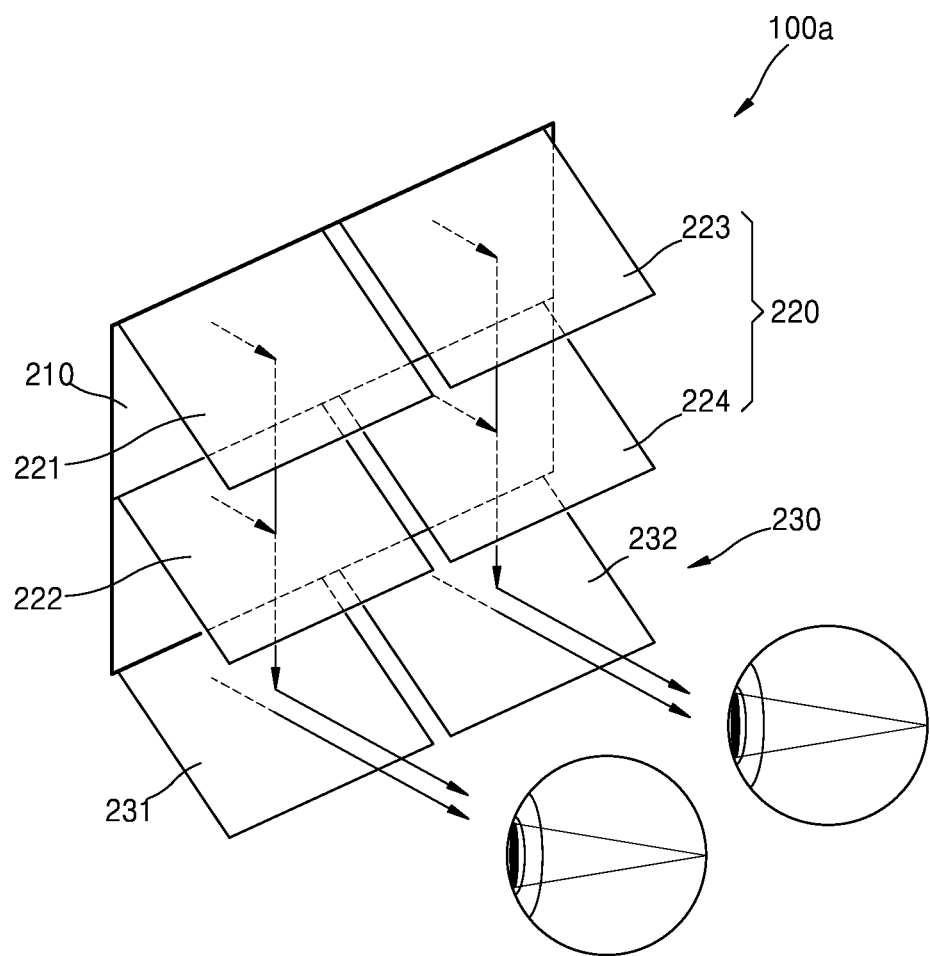
FIG. 4 is a diagram illustrating a concept of the see-through type display apparatus having the spatial light modulator of FIG. 3.

FIG. 3 is a diagram illustrating an image output from a spatial light modulator 210 of a see-through type display apparatus 100a, according to another exemplary embodiment. FIG. 4 is a diagram illustrating a concept of the see-through type display apparatus 100a having the spatial light modulator 210 of FIG. 3.

As illustrated in FIG. 3, the spatial light modulator 210 may simultaneously output a first left-eye image IL1 and a first right-eye image IR1 having first depth information, and a second left-eye image IL2 and a second right-eye image IR2 having second depth information, onto different regions. For example, the spatial light modulator 210 may divide a region onto which images are to be output into four regions, and simultaneously output the first left-eye image IL1, the first right-eye image IR1, the second left-eye image IL2, and the second right-eye image IR2 onto each respective one of the four regions.

When four 2D images are simultaneously output, a depth generation member 220 of the see-through type display apparatus 100a may include four sub-depth generation members 221, 222, 223, and 224, as illustrated in FIG. 4. The first and second depth generation members 221 and 222 may produce a multi-layered depth image for a left eye. The third and fourth depth generation members 223 and 224 may produce a multi-layered depth image for a right eye. A method of producing a multi-layered depth image is as described above and is thus not described in detail again here.

The image convergence member 230 may include a first image convergence member 231 for causing the multi-layered depth image for a left eye and a reality environment to converge on one single region, and a second image convergence member 232 for causing the multi-layered depth image for a right eye and the reality environment to converge on one single region.

Since one spatial light modulator 210 outputs an image for a left eye and an image for a right eye as described above, not only the number of elements of the see-through type display apparatus 100a but also a signal processing load may be reduced.

Figure 5:
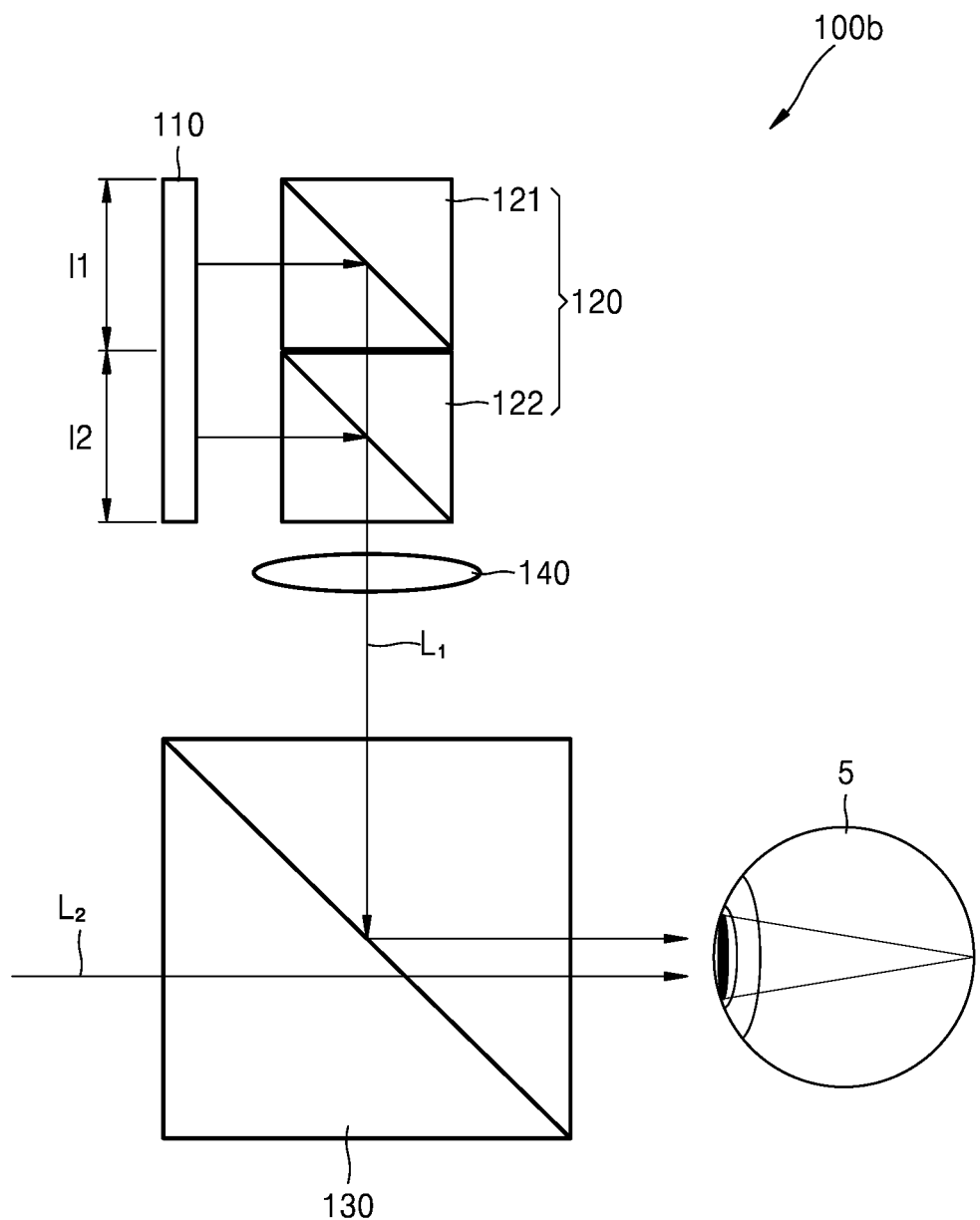
FIG. 5 is a diagram illustrating a see-through type display apparatus having an expansion optical device, according to another exemplary embodiment.

FIG. 5 is a diagram illustrating a see-through type display apparatus 100b including an expansion optical device 140, according to an exemplary embodiment.

A spatial light modulator 110 is very small in size, and a 2D image output from the spatial light modulator 110 and a multi-layered depth image produced by a depth generation member 120 are also relatively small. The see-through type display apparatus 100b according to another exemplary embodiment may further include the expansion optical device 140 which is arranged between the depth generation member 120 and an image convergence member 130 in order to expand the size of a multi-layered depth image.

As a plurality of 2D images having different depth information are propagated through the depth generation member 120, a light path length may be changed, and thus the brightness of these images may be changed. Thus, the spatial light modulator 110 may output 2D images by changing the brightness of the 2D images. For example, the spatial light modulator 110 may control the brightness of a 2D image having high-level depth information to be higher than that of a 2D image having low-level depth information. Referring to FIG. 5, a first image I1 having first depth information is transferred to the image convergence member 130 via first and second depth generation members 121 and 122, whereas a second image I2 having second depth information is transferred to the image convergence member 130 via the second depth generation member 122. Thus, a degree to which the brightness of the first image I1 is reduced may be less than a degree to which the brightness of the second image I2 is reduced. Therefore, the spatial light modulator 110 may output the first image I1 having higher brightness than that of the second image I2.

Figure 6:
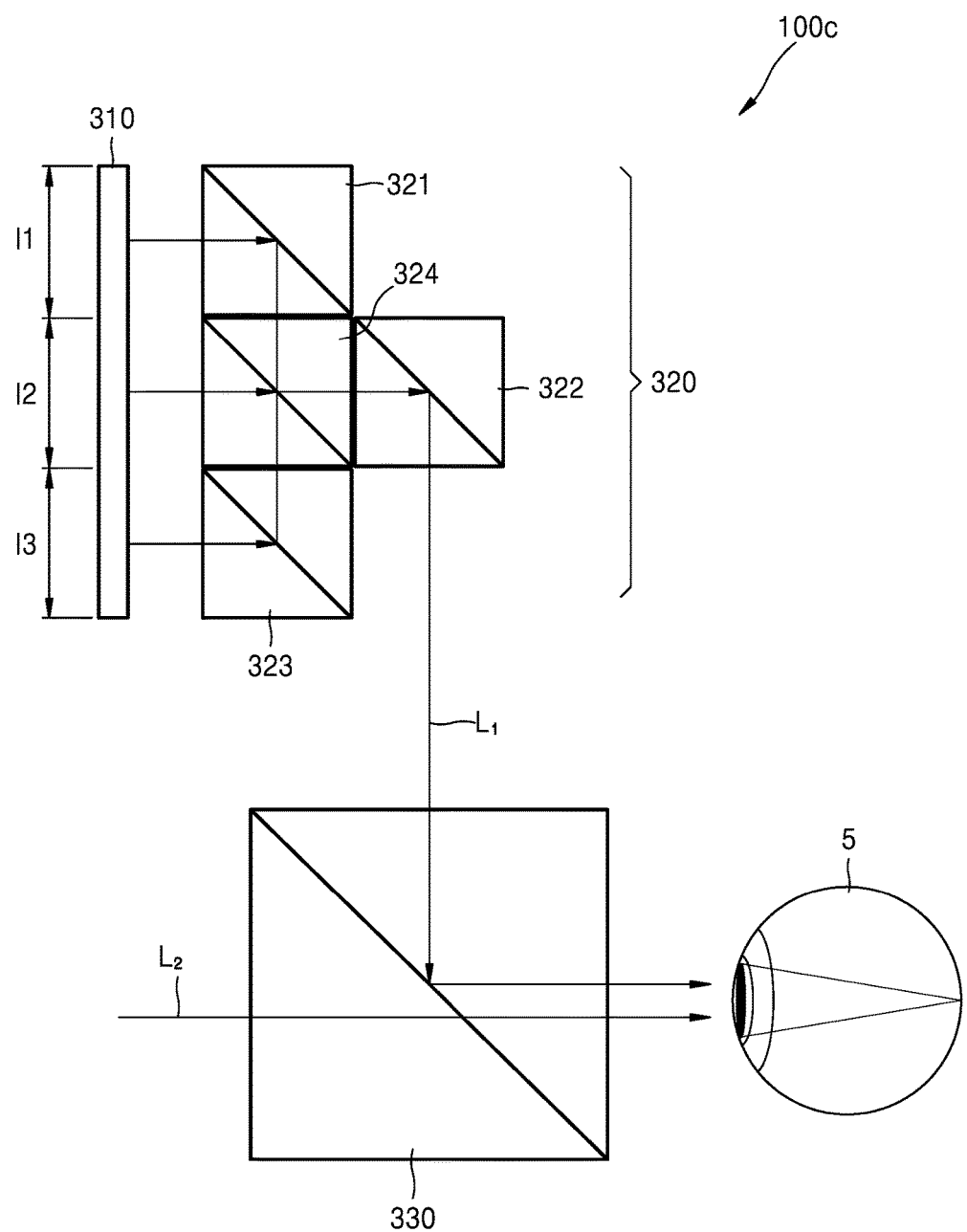
FIG. 6 is a diagram illustrating a see-through type display apparatus, according to another exemplary embodiment.

FIG. 6 is a diagram illustrating a see-through type display apparatus 100c, according to another exemplary embodiment. As illustrated in FIG. 6, a spatial light modulator 310 may simultaneously output three 2D images having different depth information. For example, the spatial light modulator 110 may simultaneously output a first image I1 having first depth information, a second image I2 having second depth information, and a third image I3 having third depth information onto different respective regions.

A depth generation member 320 may include three or more sub-depth generation members for producing a multi-layered depth image from these 2D images. For example, the depth generation member 320 may include first, second, and third depth generation members 321, 322, and 323 for reflecting an image incident thereon, and a fourth depth generation member 324 for transmitting an image incident thereon. The first, second, and third depth generation members 321, 322, and 323 may be mirrors, and the fourth depth generation member 324 may be a half-mirror.

Thus, the first image I1 may be reflected by the first depth generation member 321, transmitted through the fourth depth generation member 324, reflected by the second depth generation member 322, and then transferred to the image convergence member 130. The second image I2 may be transmitted through the fourth depth generation member 324, reflected by the second depth generation member 322, and then transferred to the image convergence member 330. The third image I3 may be reflected by the third depth generation member 323, transmitted through the fourth depth generation member 324, reflected by the second depth generation member 322, and then transferred to the image convergence member 330.

Figure 7:
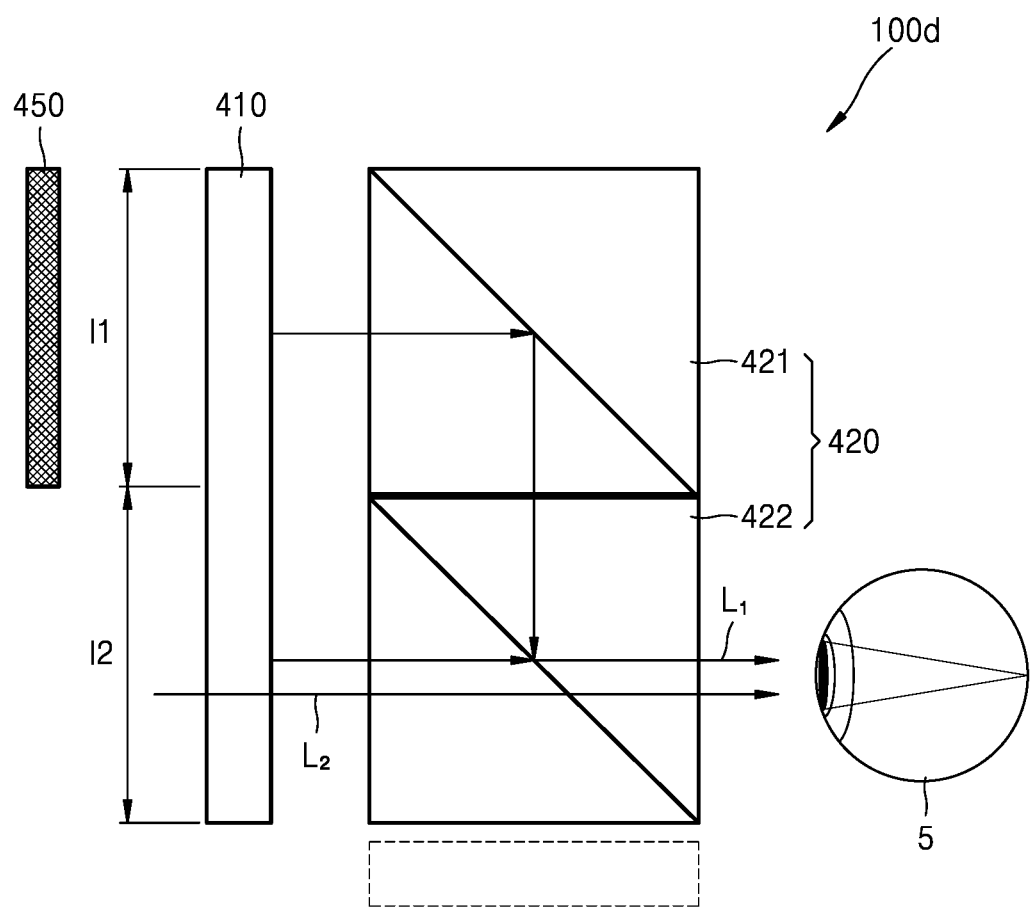
FIG. 7 is a diagram illustrating a see-through type display apparatus having a transparent spatial light modulator, according to another exemplary embodiment.

FIG. 7 is a diagram illustrating a see-through type display apparatus 100d that has a transparent spatial light modulator 410, according to another exemplary embodiment. As illustrated in FIG. 7, the spatial light modulator 410 may be transparent. A blocking member 450 may be arranged on a region of the spatial light modulator 410 so as to block a reality environment. A first image I1 output from the spatial light modulator 410 may be transferred to a user's ocular organ 5 via first and second depth generation members 421 and 422. A second image I2 output from the spatial light modulator 410 may be transferred to the user's ocular organ 5 via the second depth generation member 422 together with the reality environment. The see-through type display apparatus 100d may not include an image convergence member, and the second depth generation member 422 may serve as an image convergence member.

Figure 8:
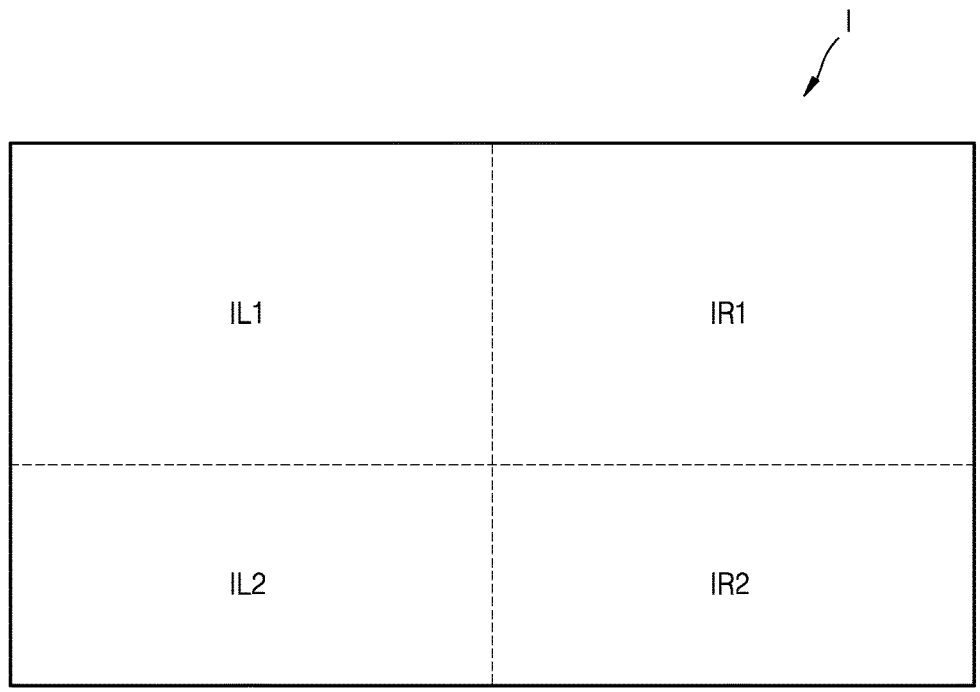
FIG. 8 is a diagram illustrating an example of an image output from a spatial light modulator of a see-through type display apparatus, according to an exemplary embodiment.

The spatial light modulator 410 may output 2D images having different respective sizes according to depth information. FIG. 8 is a diagram illustrating an example of an image output from a spatial light modulator of a see-through type display apparatus, according to an exemplary embodiment. As illustrated in FIG. 8, the spatial light modulator may output a plurality of 2D images having different respective sizes according to depth information. For example, first images IL1 and IR1, which have high-level depth information, may be greater in size than second images IL2 and IR2, which have low-level depth information. The depth generation member 120 may cause points at which the first images IL1 and IR1 are to be formed to be more distant from a user's ocular organ than points at which the second images IL2 and IR2 are to be formed. Thus, a multi-layered depth image produced from the first and second images IL1, IR1, IL2, and IR2 may be distorted due to a physical size of the depth generation member 120. Accordingly, a degree to which the multi-layered depth image is distorted may be decreased by adjusting the sizes of these 2D images.

Figure 9:
FIG. 9 is a diagram illustrating an example of an electronic device to which a see-through type display apparatus according to an exemplary embodiment is applicable.

A see-through type display apparatus as described above may be implemented as one of elements of a wearable apparatus. For example, the see-through type display apparatus is applicable to a head mounted display (HMD). Alternatively, the see-through type display apparatus is applicable to a glasses-type display or a goggle-type display. Wearable electronic devices may be operated by being linked (or connected) to a smart phone. FIG. 9 is a diagram illustrating an example of an electronic device to which a see-through type display apparatus according to an exemplary embodiment is applicable. The electronic device of FIG. 9 is an example of an HMD, a glasses-type display, or the like.

Figure 10:
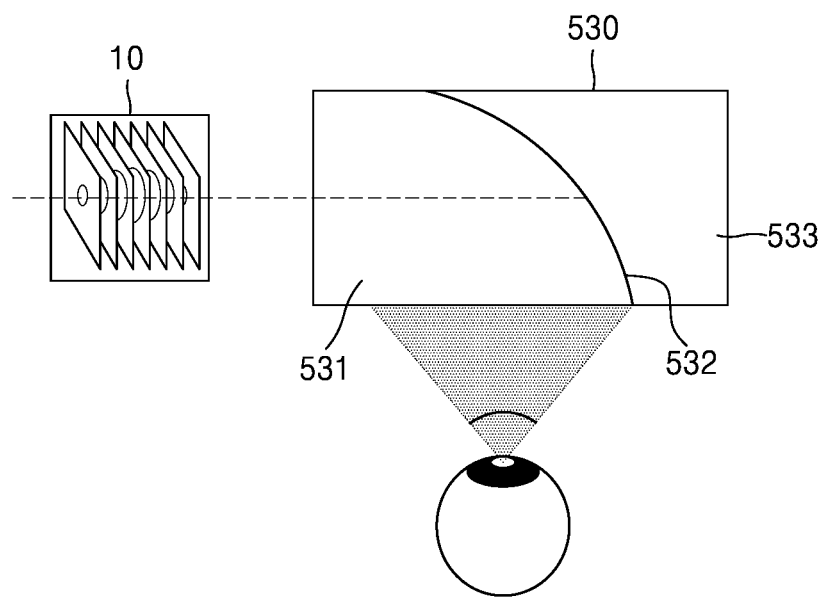
FIGS. 10 and 11 are diagrams illustrating examples of an image convergence member having a large viewing angle, according to an exemplary embodiment.
Figure 11:
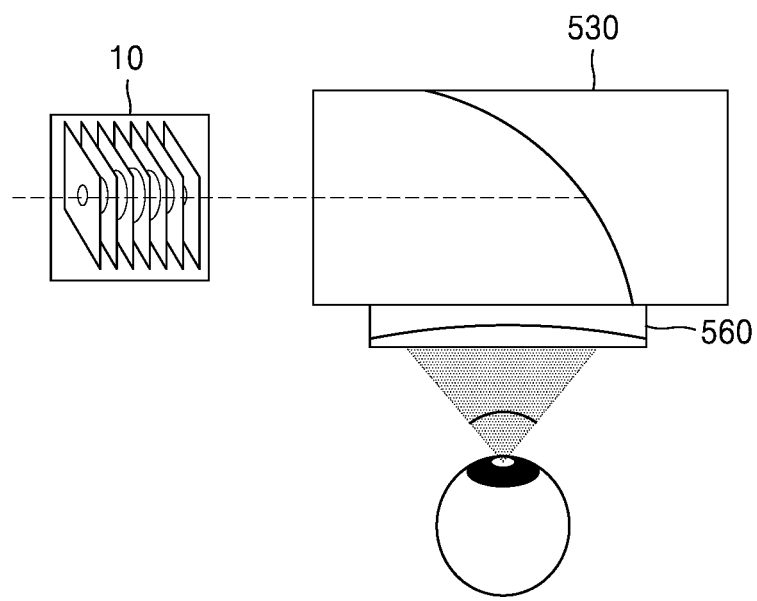

FIGS. 10 and 11 are diagrams illustrating examples of an image convergence member 530 having a large viewing angle, according to an exemplary embodiment. The image convergence member 530 illustrated in FIG. 10 may include a plurality of regions which have different respective media. For example, the image convergence member 530 may include a first region 531, and a second region 533 having a curved interface 532 which is in contact with the first region 531. A region of the curved interface 532 which is relatively close to a multi-layered depth image 10 may have a center of curvature. A reflecting material may be coated onto the interface 532. Thus, a user is able to view a wider external image.

Alternatively, as illustrated in FIG. 11, a lens 560 may be arranged between the image convergence member 530 and a user's ocular organ. The lens 560 is arranged adjacent to the user's ocular organ and thus a focal length of the lens 560 may be shorter than a diameter of the lens 560. Accordingly, a large angle of view or a large field of view may be easily secured. The lens 560 may be an anisotropic lens, and more particularly, a polarized light-dependent birefringent lens. Thus, the lens 550 may act as a lens with respect to the multi-layered depth image 10, and act as a flat panel with respect to an external image.

Figure 12:
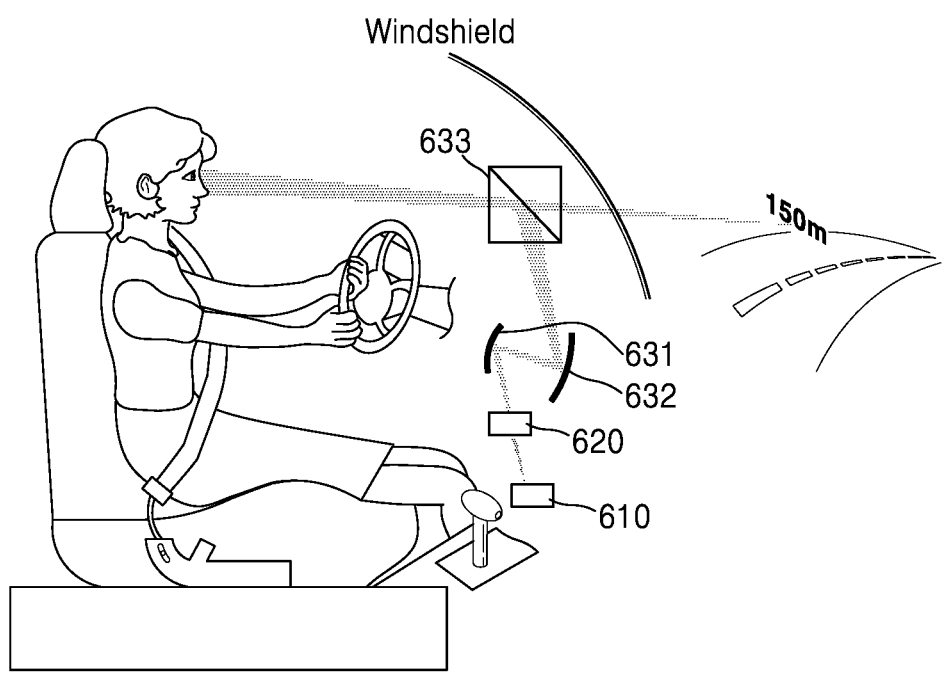
FIG. 12 is a diagram illustrating an example of a see-through type display apparatus applied to a vehicle.

FIG. 12 is a diagram illustrating an example of a see-through type display apparatus applied to a vehicle. As illustrated in FIG. 12, when a spatial light modulator 610 and a depth generation member 620 are arranged on a region of the vehicle and one or more mirrors 631 and 632 and a beam splitter 633 are used together as an image convergence member 630, a multi-layered depth image and an external image may be transferred to a user's ocular organ. The one or more mirrors 631 and 632 may include a folded mirror, an anisotropic mirror, and the like.

See-through type display apparatuses according to various exemplary embodiments are applicable to not only various electronic devices, but also to a power unit, such as a vehicle, general facility, etc. Furthermore, see-through type display apparatuses according to exemplary embodiments are applicable to various fields. In addition, see-through type display apparatuses according to exemplary embodiments are applicable to implementing AR or MR and are also applicable to other fields. In other words, the concepts of various exemplary embodiments are applicable to a multi-image display through which a plurality of images may be simultaneously viewed, as well as AR or MR.

According to one or more of the above exemplary embodiments, a see-through type display apparatus applicable to implementing AR and MR may be realized. Since 2D images may be displayed to a plurality of different depths, a more realistic image may be displayed. Since one spatial light modulator may simultaneously output a plurality of 2D images having different respective depth information, a processing load for driving a device may be decreased. Various electronic devices or optical devices including a see-through type display apparatus as described above may be manufactured.

A see-through type display apparatus applicable to AR and MR may be realized.

Since 2D images are displayed to a plurality of different depths, a more realistic image may be displayed.

Since one spatial light modulator may simultaneously output a plurality of 2D images having different respective depth information, a processing load for driving a device may be decreased.

Various electronic device or optical devices including a see-through type display apparatus as described above may be manufactured.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A see-through type display apparatus comprising:
    a spatial light modulator configured to simultaneously output a first two-dimensional (2D) image onto a first region and a second 2D image onto a second region that is different from the first region, the first 2D image having first depth information and the second 2D image having second depth information that is different from the first depth information;
    a depth generation member configured to produce a multi-layered depth image by sequentially arranging the first 2D image and the at least second 2D image based on the first depth information and the second depth information; and
    an image convergence member configured to cause the multi-layered depth image and a reality environment to converge onto a single region by changing at least one from among a light path of the multi-layered depth image and a light path of the reality environment,
    wherein the depth generation member comprises:
        a first depth generation member configured to reflect the first 2D image to the image convergence member; and
        a second depth generation member configured to reflect the second 2D image to the image convergence member, and
    wherein the second depth generation member is further configured to transmit the first 2D image reflected by the first depth generation member to the image convergence member.

2. The see-through type display apparatus of claim 1, wherein the depth generation member comprises at least one from among a mirror and a half-mirror.

3. The see-through type display apparatus of claim 1, wherein the first 2D image and the at least second 2D image are sequentially arranged on an optical axis of the depth generation member.

4. The see-through type display apparatus of claim 1, wherein for each respective 2D image from among the first 2D image and the at least second 2D image, a corresponding distance from the image convergence member varies directly with a level of depth information associated with the respective 2D image.

5. The see-through type display apparatus of claim 1, wherein at least two 2D images from among the first 2D image and the at least second 2D image have different brightnesses.

6. The see-through type display apparatus of claim 5, wherein for each respective 2D image from among the first 2D image and the at least second 2D image, a corresponding brightness varies directly with a level of depth information associated with the respective 2D image.

7. The see-through type display apparatus of claim 1, wherein at least two 2D images from among the first 2D image and the at least second 2D image have different sizes.

8. The see-through type display apparatus of claim 7, wherein for each respective 2D image from among the first 2D image and the at least second 2D image, a corresponding size varies directly with a level of depth information associated with the respective 2D image.

9. The see-through type display apparatus of claim 1, wherein each of the first 2D image and the at least second 2D image comprises a respective left-eye image and a respective right-eye image.

10. The see-through type display apparatus of claim 9, wherein for each respective 2D image from among the first 2D image and the at least second 2D image, the respective left-eye image and the respective right-eye image are simultaneously output onto different regions.

11. The see-through type display apparatus of claim 1, further comprising an expansion optical device configured to expand the multi-layered depth image, the expansion optical device being arranged between the depth generation member and the image convergence member.

12. The see-through type display apparatus of claim 1, wherein the image convergence member comprises at least one from among a beam splitter and a transflective film.

13. The see-through type display apparatus of claim 1, wherein the image convergence member comprises:
    a first region; and
    a second region having a curved interface which is in contact with the first region.

14. The see-through type display apparatus of claim 13, wherein a reflecting material is coated onto the interface of the second region.

15. A method of operating a see-through type display apparatus, the method comprising:
    simultaneously outputting a first two-dimensional (2D) image onto a first region and at least a second 2D image onto a second region that is different from the first region, the first 2D image having first depth information and the second 2D image having second depth information that is different from the first depth information;
    producing a multi-layered depth image by sequentially arranging the first 2D image and the at least second 2D image based on the first depth information and the second depth information; and
    converging the multi-layered depth image and a reality environment onto a single region by changing at least one from among a light path of the multi-layered depth image and a light path of the reality environment,
    wherein the producing of the multi-layered depth image comprises:
        reflecting the first 2D image; and
        reflecting the second 2D image while transmitting the first 2D image.

16. The method of claim 15, wherein the first depth information has a value that is greater than a value of the second depth information.

17. The method of claim 15, further comprising expanding the multi-layered depth image.

* * * * *